United States Patent Office 3,497,779
Patented Feb. 24, 1970

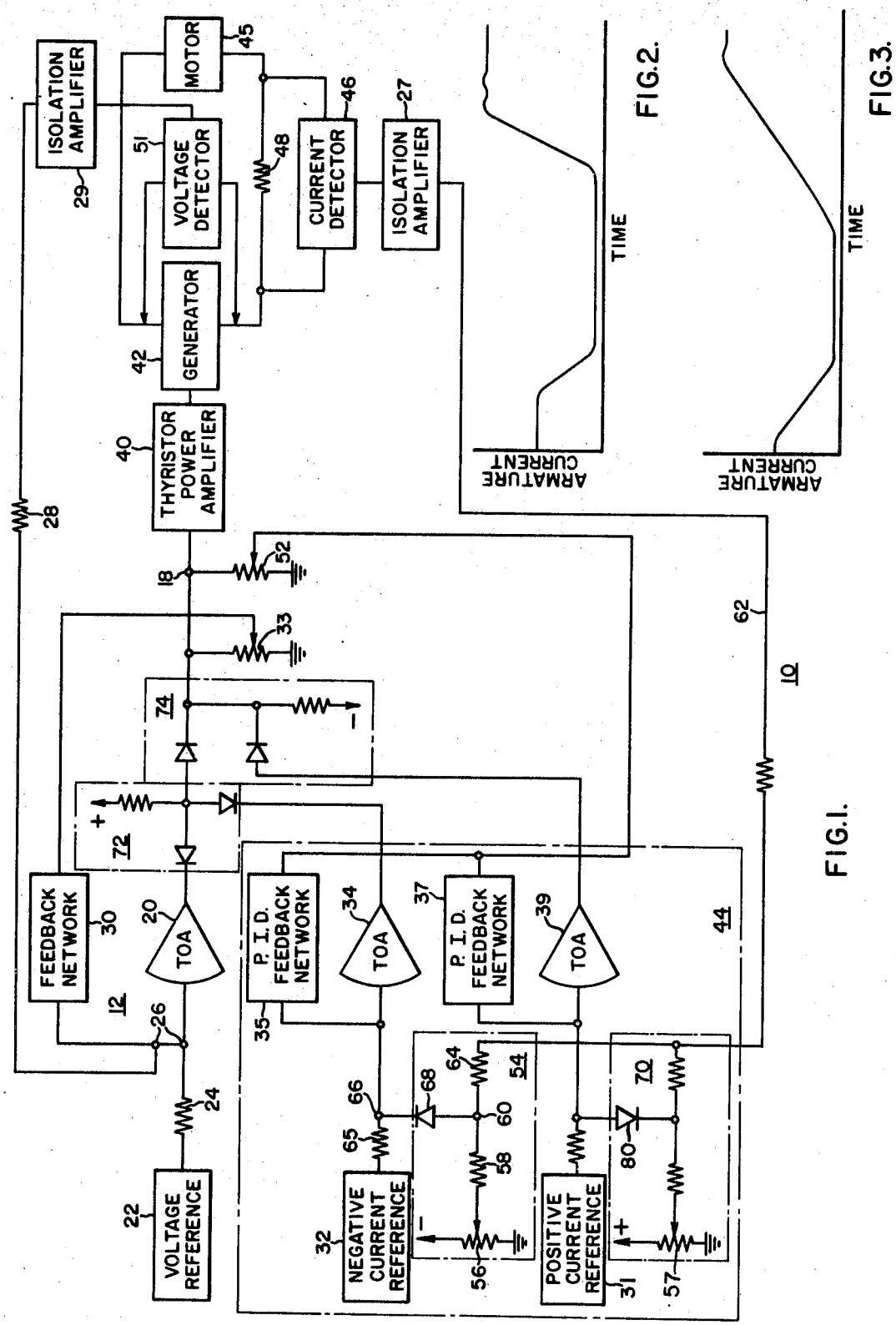

3,497,779
LIMIT OF THE RATE OF RISE OF CURRENT IN A PARALLEL CONTROL SCHEME
Hermann Eisele, Amherst, N.Y., assignor to Westinghouse Electric Corporation, Pittsburgh, Pa., a corporation of Pennsylvania
Filed Nov. 25, 1966, Ser. No. 597,010
Int. Cl. H02p 7/68
U.S. Cl. 318—18      14 Claims

ABSTRACT OF THE DISCLOSURE

Disclosed is a control system for controlling the voltage and current of a motor drive system, which control system includes respective voltage and current controllers and circuits associated with the current controller for limiting both the value of and the rate of change of motor current.

---

The present invention relates generally to a system of parallel control for generator or thyristor voltage and armature current in a motor drive system wherein fast acceleration within predetermined current limits and minimum overshooting is required, and more particularly, to a current feedback blocking scheme which limits the rate of change of current to a predetermined step.

Certain types of equipment, such as excavators, shovels, drag lines, dredges, screwdown drives in steel mills and log carriage drives in lumber mills are particularly suited for such operation. A typical power shovel today might have a loading capacity of 10 to 15 cubic yards whereas previously a capacity of 6 cubic yards was considered nominal. Previously, individual D.C. motors were used for each motion of the drag line or shovel; but, as the equipment increased in size, individual motor drives became impractical because of inertia and mechanical problems. Today, for example, the largest drag line has twelve motors to power the hoist motion alone and a total of twenty motors, energized by 6–3000 horsepower synchronous M-G sets for all motions. This increase in equipment capacity has likewise had a similar effect on cost. Therefore, it would be of great importance to the user to be able to obtain high production levels having maximum efficiency and little downtime. Pursuing this objective has necessarily led to better protection techniques for the electrical equipment under the severest of operating conditions.

Due to substantial investment in equipment of this type, the control operation must use the built-in capacity completely during each duty cycle to achieve the highest possible productivity. This requires that the drive should be operating at either maximum speed or maximum available motor torque. In controlling the latter, care and design must be taken so as to adequately protect the expensive mechanical and electrical equipment upon overloading. Moreover, a smooth and efficient drive operation is essential for simple torque and speed control. Typically, the speed of the drive must follow a reference signal without overshooting and the torque must have a closely limited build-up rate. For best operating results, it is desirable to have separate controllers for both current and voltage.

It is, therefore, a general object of the present invention to give improved operational characteristics to motor drive systems.

It is a further object of the present invention to give an improved capability to motor drive systems whereby signal stabilization can be maximized upon a change in the reference signal.

An additional object of the present invention is to give improved capability to motor drives wherein the rate of a predetermined system condition rise is held within safe limits thereby extending the life of the commutators, brushes, and armatures.

In accordance with the principles of the present invention, regulation and control of a predetermined system condition, such as applied armature current and/or voltage is achieved giving greater efficiencies with significant improvement in operation and reductions in cost. This is accomplished through the use of parallel arranged current and voltage controllers. These controllers feed into a power amplifier which controls a voltage source through energization of the field of the generator that supplies power for the motor armature. Independent voltage and current control are accomplished through a cooperative switching arrangement whereby only one controller is operating at any given time period. Included in the current controller portion is a signal value deadband arrangement which effectively blocks current feedback over a predetermined range of signal value. The rate of rise of current is thus limited since the deadband arrangement only permits the controller to see a small reference input even if a high output current is required. This gives effective control to the rate of change of current over time and eliminates overshooting.

These and other objects of the invention will become more apparent upon consideration of the following detailed description along with the attached drawings in which:

FIG. 1 is a preferred circuit diagram of the present invention applied to a parallel system of control;

FIG. 2 shows operating characteristics of known prior art systems, and

FIG. 3 illustrates the operating characteristics of applicant's system of control.

In FIG. 1, a circuit diagram is shown illustrating a parallel control system 10 comprising a voltage controller 12 and a current controller 44. The outputs of the respective controllers are connected by switching circuits 72 and 74 to a common terminal 18 such that only one controller is in operation at any given time.

The voltage controller is comprised of an operational amplifier 20 whose input is provided by a voltage reference signal 22 which is merely an adjustable voltage apparatus set by the operator for the particular speed required in any given situation. A reference input resistor 24 is provided between the voltage reference 22 and the operational amplifier 20 and is connected to a summing junction 26. Voltage feedback from the output device is through isolation amplifier 29 and resistor 28 and is likewise connected to summing junction 26. Internal feedback of the voltage controller 12 is provided by a feedback network 30 and an adjustable resistor 33, one side of which is connected to ground. Since the gain of an operational amplifier is a function of the ratio of feedback impedance to input impedance, the adjustable resistor 33 provides a method for adjusting the gain of operational amplifier 20.

The current controller 44 is comprised of two separate operational amplifiers 34 and 39 for positive and negative current respectively. The amplifiers with respective feedback networks 35 and 37 are of the known P.I.D. type as described in copending application Ser. No. 363,825, now U.S. Patent No. 3,324,363 entitled "Apparatus for Controlling a Variable of Moving Elongate Material" by Earl R. Hill and Woodward C. Carter II, and assigned to the same assignee as the present invention. Amplifier feedback is brought into the two networks and from adjustable resistor 52 to the P.I.D. networks 35 and 37 disclosed in the aforesaid Patent No. 3,324,363, a P.I.D. network provides a proportional component, an integral component, and a derivative component to the amplifier characteristic. The gain of either of the current controllers is adjusted by varying the value of adjustable resistor 52, one side of which is connected to ground. Using P.I.D. amplifiers permits compensating for generator and armature time delays. Such amplifiers make an extremely fast current loop possible. In fact, the current reaches a limit with a stalled motor of about 0.04 seconds after a step reference change. The advantage to this occurs when, for example, a bucket on a shovel is stalled and the motor comes to a sudden stop. With a fast current loop, overshoot can become quite insignificant. Although a fast current response results in a high rate of rise of armature current, this rate is controlled by the current controllers as long as the drive is operating within the steady state volt ampere region.

A significant feature of the present invention is deadband circuit 54 which blocks out a portion of the feedback thus isolating the reference voltage for providing the sole value to determine the correct $dI/dt$. Positive current feedback from the output device is fed through an isolation amplifier 27 to a resistor 64 which develops a positive potential at summing junction 60. Also connected to summing junction 60 but creating a negative potential is voltage developed by a power supply connected to an adjustable resistor 56, the other end of which is grounded. A portion of the current developed by the negative potential source and adjustable resistor 56 is channeled through resistor 58 creating a negative potential at summing junction 60. The desired result of this arrangement is to create a deadband in the feedback circuit whereby the controller will only see a small reference input even if a high current is required thus causing the current to increase on a smaller than normal reference step. The operation of the deadband is described as follows: the power supply on the upper side of potentiometer 56 acts through resistor 58 to hold junction 60 at a negative voltage which is at least more negative than the voltage normally at junction 66. Thus the diode 68 is in a non-conducting state. As current feedback increases through line 62 in a positive sense the voltage at junction 60 becomes less and less negative and ultimately goes positive thus making the voltage at 60 equal to or greater than that at 66 and permitting the diode 68 to conduct. The effect, then, is to block out the current feedback until it becomes greater than or equal to an opposing voltage from the power supply through adjustable resistor 56 and resistor 58. The rate of increase or decrease of current per time ($dI/dt$) is limited by the reference input 32 thus lessening the rate of rise or decline in the current. A similar deadband circuit 70 is provided for negative current feedback the only differences being that the diode is reversed in the position and the power supply is held at a positive voltage. Since the current is of opposite polarity, there will be the same effect and a portion of the feedback will be blocked out as previously described. Current feedback is separated into the negative and positive controllers by diodes 68 and 80. Negative current feedback is isolated from the positive controller 34 since it would tend to force the anode side of diode 68 more negative and thus lead it further into a non-conducting state. Hence, all negative feedback current would be drawn to the negative controller.

Before start of operation, the reference inputs 32 and 31 for current are set to establish a desired limit for the rate of change of armature current, and the reference inputs 56 and 57 are set to establish the proper deadband threshold values to establish limiting values for the armature current. In the case of a negative current reference, the reference input is fed through resistor 65 to summing junction 66. A like arrangement exists when a positive current reference input is required.

The switching circuit which will permit only one controller to be operating at any given time is provided through switching circuits 72 and 74. The former circuit lets the smaller (i.e., the most negative) of the outputs from amplifiers 20 and 34 prevail whereas the latter permits the larger (i.e., the most positive) of the outputs of amplifiers 20 and 39 to prevail. In effect, the voltage controller is in operation as long as the desired armature current $dI/dt$ is not exceeded or the current limit set by the deadband circuits is not reached and the current controllers remain off. When the desired $dI/dt$ is exceeded or the motor current reaches the set limit, the appropriate current controller is switched in and the voltage controller is automatically switched off. Hence the voltage controller remains in operation until the current desired motor current rate of change is exceeded or the set motor limit is reached at which time the current controller takes over until (a) the rate of change of motor current falls below the value set by reference 32 for one direction of motor current and reference 31 for the other direction, or (b) the motor current falls below the value represented by the threshold level of the particular deadband circuit involved, depending on which of the preset limits, $dI/dt$ limit or current limit, had been exceeded, that is, the current controller maintains control until that parameter of motor current, either rate of change or magnitude, which had exceeded its present limit falls below the preset limit.

The singular output from a controller provides an input to a thyristor power amplifier which subsequently energizes the generator 42 for the motor drive 45. A current detector 46 is shunted across resistor 48 for providing armature current feedback to the current controller 44. A voltage detector 51 is provided to cause the desired generator voltage feedback to the voltage controller 12. It should be noted that in each feedback arrangement, there is an isolation amplifier, 27 and 29 respectively. These isolation amplifiers allow the use of standard voltages for the feedback signals, independent of the power of the drive. Because of the high gain of the amplifiers, it is possible to take the actual current signal from the shunt in the armature loop instead of using the voltage drop across the commutating winding. This isolates the current signal from the voltage ripple across the winding and makes it independent of the operating temperature of the motor drive.

FIG. 2 shows a curve for the change of armature current over time during periods of negative and positive change without any limitation on the rate. This is to be contrasted with FIG. 3 which illustrates a similar curve with the parallel type of control and a feedback blocking system. Again note the magnitude of change is the same but the rate is much slower and more controlled than that of FIG. 2. A similar decrease in the amount of overshoot can also be seen since the degree to which overshoot can occur is less when the rate of increase is similarly less.

Although the present invention has been described with a certain degree of particularity, it should be understood that the present disclosure has been made only by way of example and that numerous changes and the details of circuitry and the combination and arrangement of parts and elements can be resorted to without departing from the spirit and scope of the present invention.

I claim as my invention:

1. Apparatus for regulating the rate of change and the overshoot characteristics of a condition regulator, said apparatus including:
   condition input reference signal means for providing an input signal having a reference component signal and a feedback component signal,
   signal amplifying means for modifying said input signal, and
   feedback blocking means for inhibiting said feedback component within a predetermined range of said component whereby said rate of change and overshoot characteristics are determined by said input reference components,
   said feedback blocking means comprising means providing a feedback blocking signal of opposite polarity relative to said feedback component signal and signal conductive means operative when said feedback component signal is of greater magnitude relative to said feedback blocking signal and when the relative difference in signal magnitude is greater than said input signal.

2. The apparatus as set forth in claim 1, with said condition being a motor armature current.

3. In a control system for controlling 1st and 2nd variables of a controllable apparatus in response to control signals, the 2nd variable being dependent on the 1st variable, (A) switching means having respective 1st and 2nd inputs, and also having an output coupled to said apparatus whereby said apparatus responds in accordance with signals appearing at said switching output, said switching means being constructed to provide at its output a control signal that is a function of that one of respective signals applied concurrently to the respective inputs of the switching means which is more of a particular polarity than the other, (B) means coupled to said first switching input for providing to that input a first reference signal representing desired value of said first variable, (C) a controller having an input summing junction and also having an output circuit coupled to said second switching input, (D) first negative feedback means connected between said switching output and said summing junction for feeding back a signal from the switching output to the summing junction, (E) means coupled to said summing junction for supplying a second reference signal to that junction to establish a limit to the rate of change of the second variable, (F) deadband circuit means having a predetermined response threshold value, and (G) second feedback means for supplying as negative feedback to said summing junction through said deadband circuit means a signal that is a function of the actual value of said second variable when the value of that signal exceeds said threshold value, whereby the second variable is limited to a value set by the response threshold value of the deadband circuit means.

4. The combination of claim 3 wherein said controller comprises an operational amplifier.

5. The combination as in claim 4 wherein said first feedback means comprises means providing P.I.D. characteristic to said amplifier.

6. The combination as in claim 4 wherein said first feedback means comprises means providing integration capability to said amplifier.

7. The combination as in claim 3 wherein the second variable is current.

8. The combination as in claim 3 wherein the first variable is voltage.

9. The combination as in claim 8 wherein the second variable is current.

10. The combination of claim 3 wherein said apparatus comprises a motor.

11. The combination of claim 10 wherein one of said variables is motor supply voltage.

12. The combination of claim 10 wherein one of said variables is motor current.

13. The combination of claim 10 wherein said first variable is motor supply voltage and the second variable is motor current.

14. The combination of claim 13 wherein said controller comprises an operational amplifier, and said first feedback means comprise means for providing an integration characteristic to said amplifier.

References Cited

UNITED STATES PATENTS

| 2,841,686 | 7/1958 | Williams. | |
| 3,210,626 | 10/1965 | Wierzbicki | 318—28 XR |
| 3,351,829 | 11/1967 | Quarnstrom | 318—18 |
| 3,366,858 | 1/1968 | Walsh | 318—18 |

B. DOBECK, Primary Examiner

U.S. Cl. X.R.

31—28